Aug. 17, 1943.  C. R. BOOK  2,327,164
SOCKET
Filed March 30, 1942
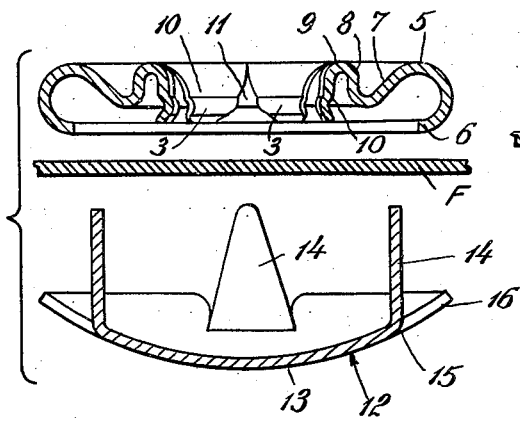
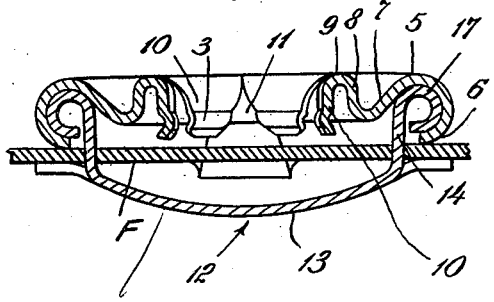
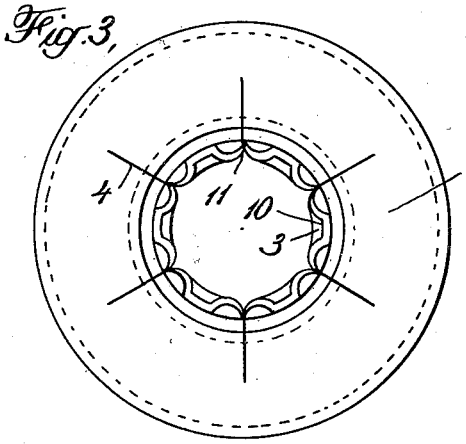
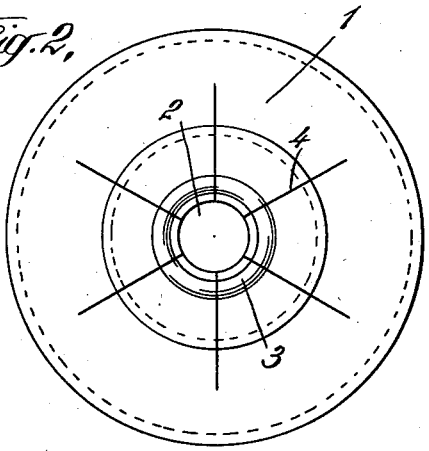
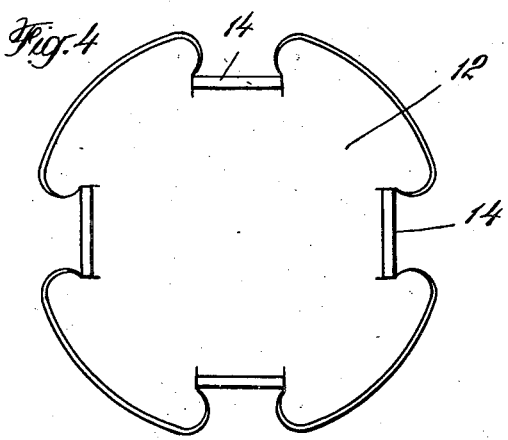
INVENTOR
*Charles R. Book*
BY
*Pennie Davis Marvin & Edmonds*
ATTORNEYS Patented Aug. 17, 1943

2,327,164

UNITED STATES PATENT OFFICE 2,327,164

SOCKET

Charles R. Book, Waterbury, Conn., assignor to Eyelet Specialty Company, Waterbury, Conn., a corporation of Connecticut Application March 30, 1942, Serial No. 436,757

3 Claims. (Cl. 24—216)

This invention relates to snap fasteners and more particularly to an improved socket member for snap fasteners.

Various types of sockets now in use are formed of a single piece of metal and provided with a portion forming a clenching ring to receive prongs carried by an attaching plate, the body of which is arranged on the opposite side of the fabric or other carrying medium. In some instances the clenching portion of the socket member is formed adjacent the central stud engaging portion, but it has been found better practice to arrange it at the outer periphery of the socket member to permit greater freedom of movement of the stud engaging portion.

In one of the most widely used forms of socket members having the clenching portion at the periphery, the central stud engaging portion extends outwardly, or away from the fabric, and terminates in fingers which engage the stud and which are of the thickness of the metal from which the socket member is formed. This results in a certain amount of undesirable play when the shank of the stud, below the head, is of a greater height than the thickness of these fingers.

In the present invention I have provided a socket member and fastening plate having the advantages of simplicity of construction, cheapness of manufacture, and ease of assembly, and possessing certain other advantages over devices of this character heretofore available.

The socket member is formed of a single piece of metal having its outer periphery curved to form a clenching portion to receive the prongs carried by an attaching plate. The material of the socket member is then curved inwardly, toward the fabric when in position, and then outwardly to provide resilience for the central stud engaging portion. The metal is split radially to form a plurality of resilient stud engaging fingers. These engaging fingers extend inwardly, toward the fabric, as contrasted to prior constructions, and are sufficiently resilient to pass the head of the stud and engage the shank or stem below the head. In a preferred form of the invention the fingers are provided with a ring or bead, the width of which is substantially equal to the length of the shank of the stud below the head so that when the socket member is engaged by a stud, all play or relative motion is eliminated.

The attaching plate is formed of a single piece of metal, preferably dished, and provided with a plurality of prongs cut from the body and extending upwardly therefrom. The prongs are thus arranged inwardly of the edge of the plate providing a bearing motion outwardly of the points where the prongs pass through the fabric. By forming the prongs in this manner I also produce an attaching plate which is of pleasing design and therefore lends itself to use on portions of garments that are exposed to view.

In the accompanying drawing I have shown one embodiment of the invention. In this showing:

Fig. 1 is a vertical, sectional view through the socket member and attaching plate, disassembled showing the fabric or other carrying medium in position between the two;

Fig. 2 is a top plan view of a partially formed socket member;

Fig. 3 is a bottom plan view of a socket member in final form;

Fig. 4 is a plan view of the attaching plate; and

Fig. 5 is an assembled view of the two elements showing the prongs received in the ring portion of the socket member and clenched.

Referring to the drawing, the socket member is formed of a single piece of metal or other suitable material, preferably in the form of a disc 1, having a central opening 2 (see Fig. 3). In one of the first forming operations, a bead or ring 3 is formed adjacent the central opening and the disc is provided with a plurality of radial slits 4, shown as six, extending from the central opening to a point inwardly of the outer edge or rim. The socket member is shaped to form an anvil portion 5 adjacent the outer edge and beyond the anvil portion it is curved inwardly as at 6 to form a clenching portion or ring. Inwardly of the anvil portion the socket member is curved inwardly as at 7 and outwardly as at 8 to provide resiliency. The portion 9 beyond the outwardly curved portion is in substantially the same plane as the anvil portion 5, forming a socket member that is relatively flat. Beyond the portion 9 a plurality of fingers 10 are formed by the radial slits 4, these fingers extending inwardly as shown. The fingers when bent inwardly are separated from each other due to the fact that they are moved into a circle of larger diameter than the original opening 2, forming spaces 11 between the inner ends of the fingers. A portion of the ring or bead 3 is arranged on the engaging section of each finger.

As illustrated in Figs. 1 and 5, the socket member is placed upon one side of a sheet of fabric F or other carrying medium and is secured to the fabric by means of prongs carried by an attaching plate placed on the other side of the fabric. While any type of attaching plate may be used, I have illustrated an improved form of attaching plate forming a part of the invention and capable of use in connection with the socket member herein disclosed. As shown I provide an attaching plate 12 the central portion of which is preferably dished as indicated at 13. The attaching plate is made from a single piece of metal substantially circular in shape but provided with projecting portions which are adapted to be bent upwardly to form prongs 14. As shown the bases 15 of the prongs are arranged inwardly of the edge of the plate 12 forming a flange or bearing portion 16.

When the two parts are assembled, as shown in Fig. 5, the prongs 14 are passed through the carrying medium F and engage the anvil portion 5. When pressure is applied, the ends of these prongs curl within the ring portion 6 of the socket member, as indicated at 17 and the parts are thus clenched together. At the same time the flanges 16 which originally follow the curvature of the body portion of the plate 12, as shown in Fig. 1, are flattened as shown in Fig. 5. This provides a bearing surface exteriorly of the prongs and on the opposite side of the fabric from the outer portion of the socket member. The construction of the attaching plate in this way not only provides an efficient means for securing the socket member in position, but also produces an attaching member that is pleasing in appearance, if it is installed on garments and the like in a place where it is exposed to view. This will be apparent from the plan view of the attaching plate shown in Fig. 4 of the drawing.

I claim:

1. A device of the character described comprising a socket member adapted to be arranged on one side of a carrying medium and an attaching plate arranged on the opposite side, the socket member comprising a single piece of material having a central opening, the outer edge being curved inwardly to form a clenching portion, the curved clenching portion extending through an arc of more than 180° to provide an opening between the body portion and the curved portion, the material around the central opening being slitted to form a plurality of fingers, the fingers extending inwardly toward the carrying medium and terminating outwardly of the plane of the edge of the curved clenching portion, the attaching plate being adapted to be arranged on the opposite side of the carrying medium, and prongs formed on the attaching plate adapted to pass through the carrying medium and be clenched in the clenching portion of the socket member.

2. A device of the character described comprising a socket member adapted to be arranged on one side of a carrying medium and an attaching plate arranged on the opposite side, the socket member comprising a single piece of material having a central opening, and having an annular bead formed on its upper face surrounding said opening, the outer edge being curved inwardly to form a clenching portion, the curved clenching portion extending through an arc of more than 180° to provide an opening between the body portion and the curved portion, the material around the central opening being slitted to form a plurality of fingers, the fingers extending inwardly toward the carrying medium and terminating outwardly of the plane of the edge of the curved clenching portion, a portion of the bead being arranged on the engaging surface of each of said fingers, the attaching plate being adapted to be arranged on the opposite side of the carrying medium, and prongs formed on the attaching plate adapted to pass through the carrying medium and be clenched in the clenching portion of the socket member.

3. A device of the character described comprising a socket member adapted to be arranged on one side of a carrying medium and an attaching plate arranged on the opposite side, the socket member comprising a single piece of material having a central opening, the outer edge being curved inwardly to form a clenching portion, the curved clenching portion extending through an arc of more than 180° to provide an opening between the body portion and the curved portion, the material around the central opening being slitted to form a plurality of fingers, the fingers extending inwardly toward the carrying medium and terminating outwardly of the plane of the edge of the curved clenching portion, the material between the clenching portion and the fingers being curved inwardly a distance less than the dimension of the clenching portion and then curved outwardly to the plane of the outer face of the clenching portion, the attaching plate being adapted to be arranged on the opposite side of the carrying medium, and prongs formed on the attaching plate adapted to pass through the carrying medium and be clenched in the clenching portion of the socket member.

CHARLES R. BOOK.